United States Patent [19]
Seki et al.

[11] 3,956,942
[45] May 18, 1976

[54] MECHANISM PRODUCING A LINEAR RECIPROCATING OUTPUT MOTION WITH A LOW SPEED INTERVAL NEAR THE CENTER OF THE STROKE

[75] Inventors: Mitsuru Seki, Sagamihara; Toru Hosoda, Zama, both of Japan

[73] Assignee: Nissan Motor Co., Ltd., Japan

[22] Filed: Mar. 19, 1974

[21] Appl. No.: 452,521

[30] Foreign Application Priority Data
Mar. 22, 1973  Japan.............................. 48-31840

[52] U.S. Cl........................................ 74/52; 74/42; 74/40; 74/99 R
[51] Int. Cl.² ................................... F16H 37/12
[58] Field of Search............ 74/42, 40, 44, 52, 435, 74/29

[56]  References Cited
UNITED STATES PATENTS

| | | | |
|---|---|---|---|
| 1,487,660 | 3/1924 | Kingston et al. | 74/42 |
| 3,415,132 | 12/1968 | Druseikis | 74/42 |
| 3,459,056 | 8/1969 | Lea | 74/29 |

Primary Examiner—Samuel Scott
Assistant Examiner—Wesley S. Ratliff, Jr.
Attorney, Agent, or Firm—Robert E. Burns; Emmanuel J. Lobato; Bruce L. Adams

[57]  ABSTRACT

A gear is oscillatingly rolled on a fixed gear so that a pin fixed thereto describes epitrochoidal movement. The pin rocks a sector gear to reciprocate a rack meshing therewith. A low speed interval is produced when the pin position corresponds to a cusp of the epicycloid.

4 Claims, 8 Drawing Figures

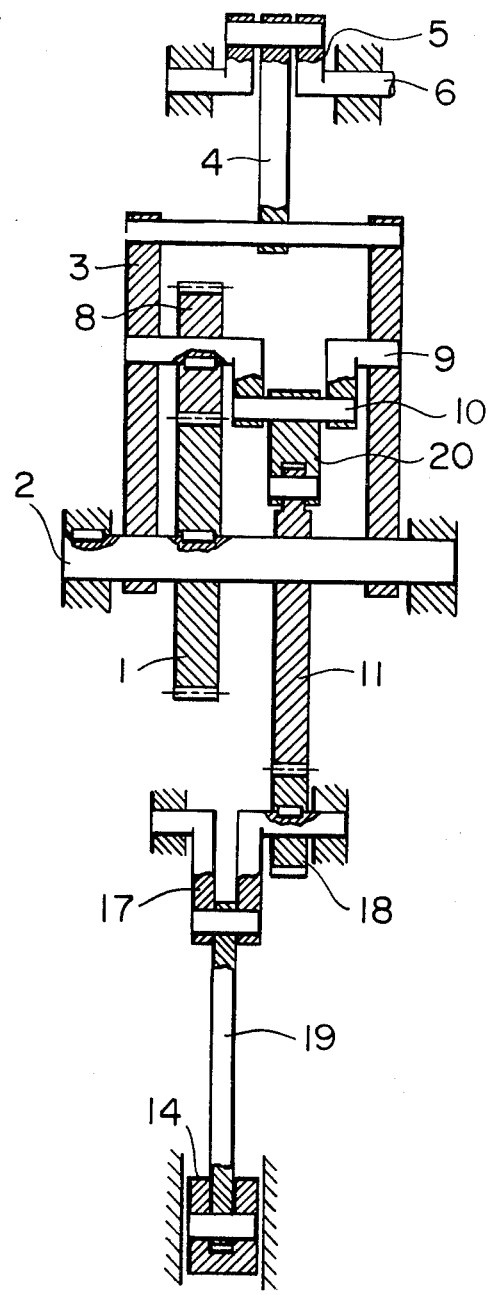

MECHANISM PRODUCING A LINEAR RECIPROCATING OUTPUT MOTION WITH A LOW SPEED INTERVAL NEAR THE CENTER OF THE STROKE

This invention relates in general to a crank mechanism type driving device, and more particularly to an apparatus for producing reciprocating motion with a low speed interval near the center of the stroke.

A conventional crank mechanism type driving device for use in a materials handling system, e.g., a lifting device and a conveying device, has a crank to reciprocate a slider for receiving and delivering an article. In such a device, the displacement curve of the slider driven by the crank is a sine curve, and the velocity curve thereof is a cosine curve. As is well known, the slider reaches its maximum speed at the middle of its stroke and zero speed at the ends of its stroke. If the article is received or delivered during a high speed portion of the stroke, it may be damaged. Therefore, it is desired to reduce the speed of the slider around the middle of its stroke.

It is, therefore, an object of the present invention to provide a mechanism for producing reciprocating motion having a low speed portion around the middle of its stroke.

It is another object of the present invention to provide an apparatus for generating a reciprocating motion having a low velocity portion in its stroke, which may optionally change the position of the low velocity portion within the stroke.

It is still another object of the present invention to provide an apparatus for generating a reciprocating motion having a low velocity portion in its stroke, which may optionally easily vary with the reciprocating stroke, speed or acceleration.

It is still another object of the present invention to provide an apparatus for generating a reciprocating motion having a low velocity portion in its stroke, which may prevent damage to an article being handled in a lifting device or conveying device used on an automatic line.

According to the present invention, there is provided an apparatus for generating a reciprocating motion having a low velocity portion in its stroke, comprising a stationary gear, a rockable frame rockably supported on the central shaft of the stationary gear, a rotatable gear journaled on the rockable frame and rotating on the outer periphery of the stationary gear, a sector gear rotatably mounted on the central shaft of the stationary gear and having a radially extending elongated slot, a crank form gear shaft connected to the rotatable gear and having an eccentric portion movably disposed in the elongated slot of the sector gear, and a slider connected to the sector gear wherein the sector gear is rocked by a predetermined epicycroid curve of the eccentric portion of the crankshaft produced by the rocking motion of the rockable frame to reciprocate the slider at a low velocity portion in the middle of its stroke through a transmitting mechanism engaged with the sector gear.

These and other objects, features and advantages of an apparatus for generating a reciprocating motion having a low velocity portion in its stroke according to the present invention will become more apparent from the followng description taken in conjunction with the accompanying drawings, in which:

FIG. 8 is a sectional view of the apparatus shown in FIG. 7.

Figure 1:
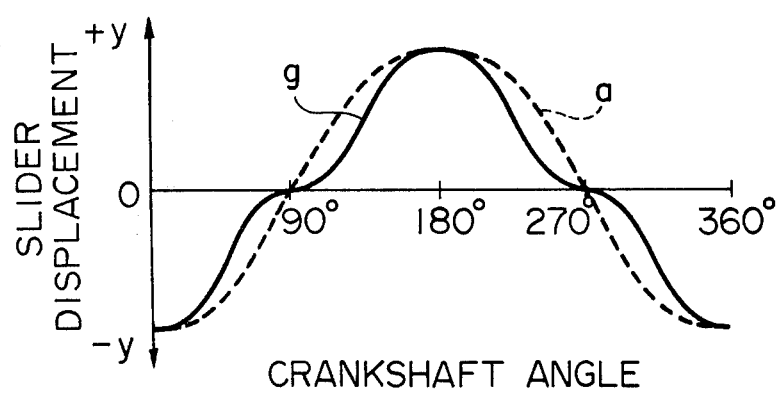
FIG. 1 is a graph comparing the slider displacement vs. crankshaft angle of a conventional slider-crank mechanism and a mechanism embodying the invention.
Figure 2:
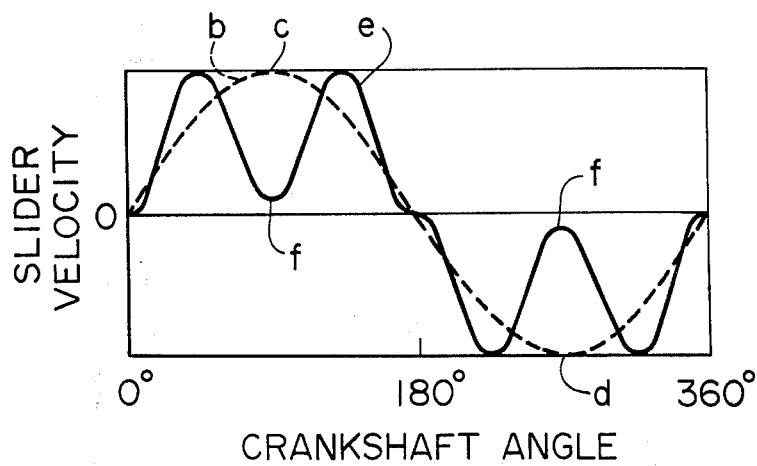
FIG. 2 is similar to FIG. 1 but shows the slider velocity vs. crankshaft angle.

As shown by the curve $a$ in FIG. 1, the displacement of a slider (driven by a crank) of a conventional slider-crank driving device is a sine curve, and the velocity of the slider varies as shown by the curve $b$ in FIG. 2. In such a driving device, the velocity of the slider is maximum at the middle of its stroke, or at the points designated as $c$ and $d$ in FIG. 2. Accordingly, if this driving device is used as a lifting device or a conveying device, there exists the possibility that an article being handled may be damaged, particularly when the article is delivered at high speed.

Therefore, it is desired to provide a slider displacement curve designated as $g$ in FIG. 1 and a slider velocity curve designated as $e$ in FIG. 2 having low speed portions $f$ near the middles of the strokes.

Figure 3:
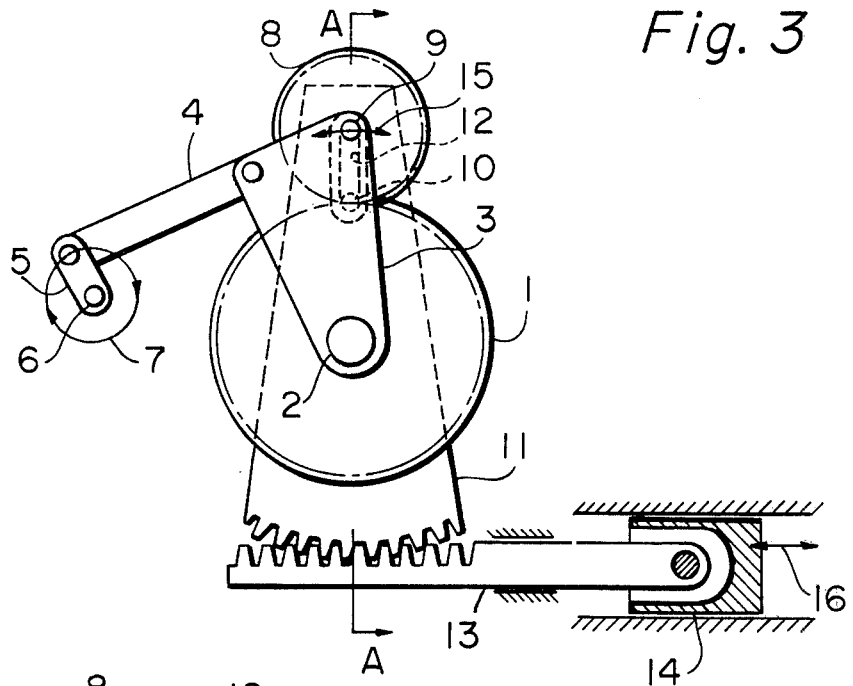
FIG. 3 is a side view of one embodiment of an apparatus according to the present invention.
Figure 4:
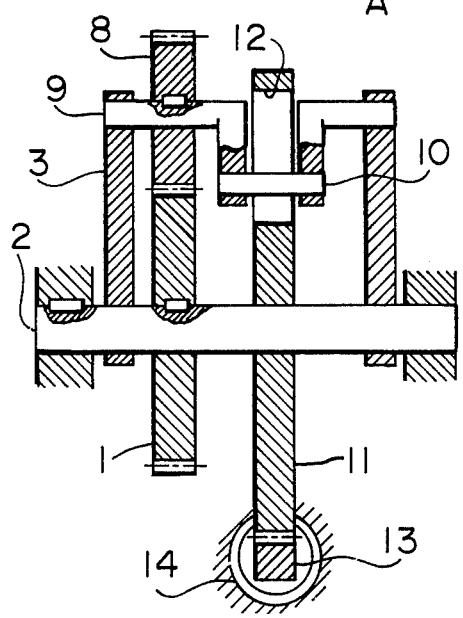
FIG. 4 is a sectional view of the mechanism of FIG. 3 taken along the line A—A in FIG. 3.

Referring now to FIGS. 3 and 4, which show one embodiment of a mechanism of the invention, numeral 1 indicates a stationary gear fixedly mounted on a fixed center shaft 2 by a key, and a rockable frame 3 is rotatably mounted on the shaft 2 in such a manner that a connecting rod 4 is connected at one end to the other side of the rockable frame 3 and is also rockably connected at the other end to a crank 5 so as to rotate the rockable frame 3 by the crank 5 as shown in FIG. 3. A prime mover (not shown) is connected to the crank 5 integrally connected to a drive shaft 6 driven thereby in a rotary motion as shown by the arrow 7 in FIG. 3.

A rotatable gear 8 rolling on the outer periphery of the stationary gear 1 in mesh with the gear 1 is rotatably journaled to the rockable frame 3 by a gearshaft 9 as a crankshaft rotating together with the gear 8.

An eccentric portion 10 of the crankshaft 9 is movably disposed in a radially extending elongated slot 12 of the sector gear 11 rotatably mounted on the center shaft 2 of the stationary gear 1.

A rack 13 is engaged reciprocatingly along a predetermined path with the sector gear 11, and a slider 14 is connected to one end of the rack 13.

The operation of an apparatus or a mechanism of the present invention will now be described.

When the crank 5 is rotated at constant angular velocity by the drive shaft 6 as shown by the arrow 7 in FIG. 3, the rockable frame 3 is rocked around the center shaft 2 of the stationary gear 1 through the connecting rod 4 as illustrated by the arrow 15 in FIG. 3, and thus the gear 8 rolls reciprocatingly on the stationary gear 1 within a range while rotating the crankshaft 9. Therefore, the eccentric portion 10 of the crankshaft 9 moves reciprocatingly along a on epicycloidal path or curve.

When the eccentric portion 10 of the crankshaft 9 moves along the epicycloidal curve, the sector gear 11 rocks around the center shaft 2 through the engagement of the eccentric portion 10 of the crankshaft 9 with the elongated slot 12 of the sector gear 11 so that the velocity of the eccentric portion 10 is reduced at the position, as shown in the drawing, nearest to the stationary gear 1 on both the backward and forward strokes. Therefore, the sector gear 11 reciprocatingly rocks the slider 14 through the rack 13 engaged therewith as indicated by the arrow 16 in FIG. 3 so as to obtain the curve g in FIG. 1 having reduced velocity portions in the vicinity of the mid strokes of the backward and forward strokes, respectively, as illustrated by f in FIG. 2.

Figure 5:
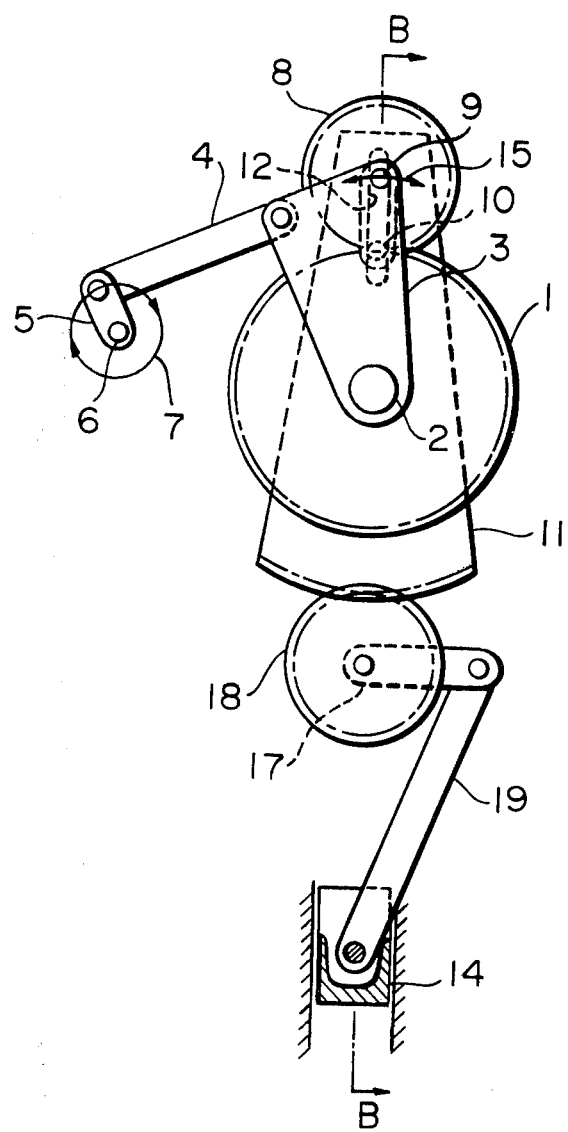
FIG. 5 is a side view of another embodiment of a mechanism according to the present invention.
Figure 6:
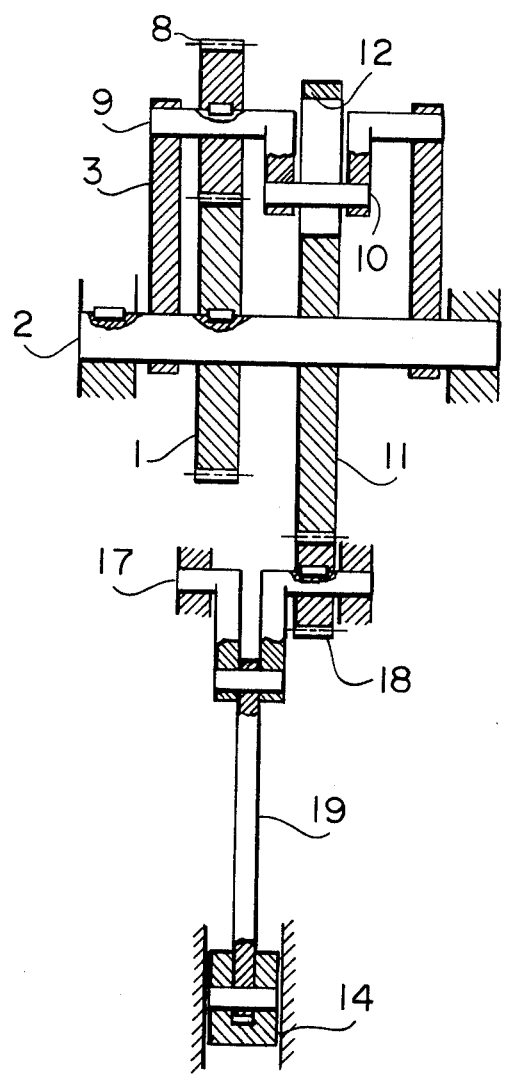
FIG. 6 is a sectional view of the mechanism of FIG. 5 taken along the line B—B in FIG. 5.

Referring now to FIGS. 5 and 6, which show a second embodiment of an apparatus or a mechanism of the invention, the sector gear 11 is engaged with a pinion gear 18 rotating together with a crankshaft 17, and the crank of the crankshaft 17 is connected to the slider 14 by a connecting rod 19.

Accordingly, in this embodiment, the rocking motion of the sector gear 11 having the low velocity portion in the middle of the rotary stroke as described above is converted to the reciprocating motion of the slider 14 through the pinion gear 18, the crankshaft 17 and the connecting rod 19, so as to obtain the reciprocating curve g in FIG. 1 having the low velocity portion in the backward and forward strokes as designated by f in FIG. 2 as in the case of the first embodiment.

Figure 7:
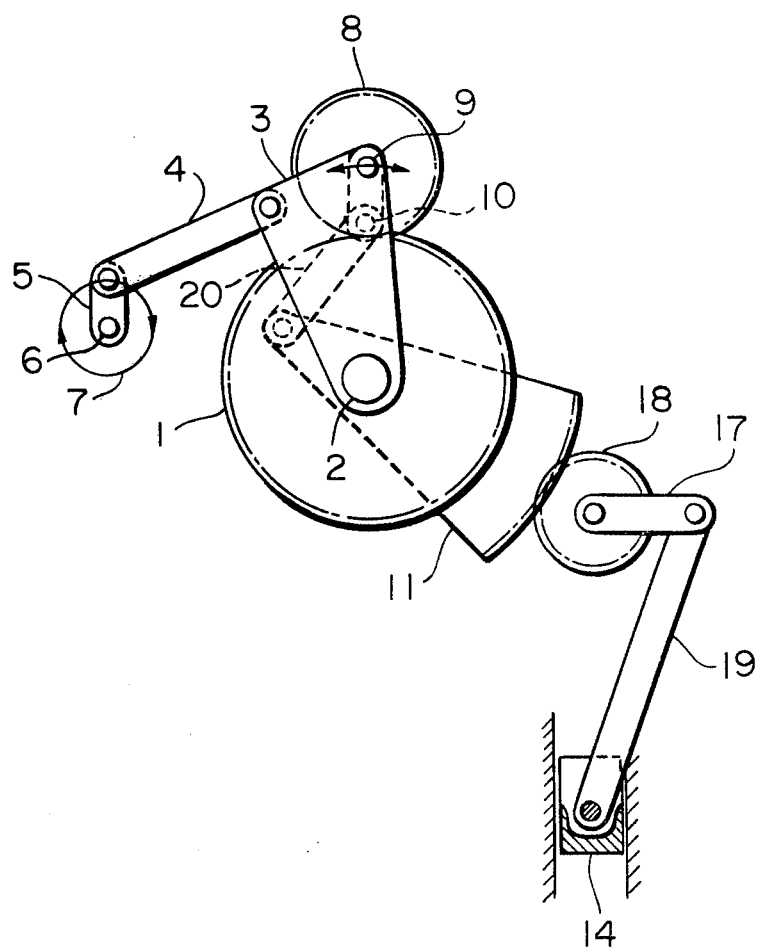
FIG. 7 is a side view of still another embodiment of an apparatus according to the present invention.

Referring now to FIGS. 7 and 8, which show still another embodiment of an apparatus or a mechanism of the invention, the eccentric portion 10 of the crankshaft 9 is connected to the sector gear 11 by a connecting rod 20, and the transmitting mechanism from the sector gear 11 to the slider 14 is similar to the second embodiment shown in FIGS. 5 and 6.

In this embodiment, the reciprocating motion of the eccentric portion 10 of the crankshaft 9 drawing the epicycroid curve is transmitted through the connecting rod 20 to the sector gear 11 so that the sector gear 11 rocks with the low velocity portions in the middles of the rotary strokes on the center shaft 2 of the stationary gear 1 similar to the second embodiment so as to reciprocate the slider 14 similarly to the embodiment shown in FIGS. 5 and 6. Accordingly, the reciprocating motion having the low velocity portion can be generated in both backward and forward strokes of the slider 14.

It should be understood from the foregoing description that since the apparatus of the present invention, the reciprocating motion of the slider having the low velocity portions in the strokes may be easily generated, the positions of the low velocity portions in the strokes may be optionally varied only by changing the engaging position of the gear 8 with the stationary gear 1, and simultaneously this low velocity portions may always be at the same position in the backward and forward strokes of the slider, and yet the stroke, speed or acceleration of the reciprocating motion of the slider may be optionally varied easily by varying the gear ratio between the respective gears, and its design is not restricted by any means because the gear ratio is not required to be a multiple of an integer.

What is claimed is:

1. A mechanism for generating a reciprocating motion having a low velocity portion in its stroke, comprising a stationary gear, a rockable frame rockably supported on a center shaft of said stationary gear, a rotatable gear journalled on said rockable frame and rollable on the outer periphery of said stationary gear, a sector gear rotatably mounted on the center shaft of said stationary gear and having a radially extending elongated slot; a crankshaft connected to said rotatable gear and having an eccentric portion disposed in said elongated slot of said sector gear, said eccentric portion being movable along an epicyloid curve, and a slider connected to said sector gear such that said sector gear is rocked by the epicycloidal curve of the eccentric portion of said crankshaft produced by the rocking motion of said rockable frame to reciprocally move said slider with an intermediate low velocity portion through a transmitting mechanism engaged with said sector gear.

2. A mechanism as set forth in claim 1, wherein said sector gear is engaged with a pinion gear rotating together with a crankshaft connected to said slider by a connecting rod.

3. A mechanism as set forth in claim 1, wherein the eccentric portion of said crankshaft is connected to said sector gear by a connecting rod.

4. A mechanism for generating a reciprocating motion having a low velocity portion in the vicinity of its mid-stroke comprising: a fixed center shaft; a stationary gear fixed on said stationary shaft; a rockable frame rockably supported on said center shaft and rockably driven during use of the mechanism; a rotatable gear journalled on said rockable frame and rollable back and forth on the outer peripherby of said stationary gear in response to rocking movement of said rockable frame; a sector gear rotatably mounted on said center shaft and having a radially extending elongated slot; a gear crankshaft fixed to said rotatable gear and having an eccentric portion slidably disposed in said elongated slot of said sector gear so that said eccentric portion undergoes movement along an epicycloidal path in response to rocking movement of said rockable frame to thereby accordingly move said sector gear about said center shaft; a movable slider, and means interconnecting said slider to said sector gear so that movement of said sector gear effects reciprocal movement of said slider through forward and backward strokes with an intermediate low velocity portion in the vicinity of each mid-stroke.

* * * * *